United States Patent Office 2,991,653
Patented July 11, 1961

2,991,653
CONTROL APPARATUS
John F. Thompson, Minneapolis, Minn., assignor to Minneapolis-Honeywell Regulator Company, Minneapolis, Minn., a corporation of Delaware
Filed May 1, 1959, Ser. No. 810,473
11 Claims. (Cl. 73—336.5)

This invention relates to a new and improved semiconductor control apparatus for sensing and regulating a condition, and more particularly relates to improvements in the condition sensing bridge circuit which provides control signals to the semiconductor control circuit.

In the field of condition control, it is often desirable that an impedance bridge circuit be used to detect a deviation in the condition being sensed from a desired condition, the sensing element generally forming at least a portion of one leg of the bridge circuit. Certain of these sensors vary greatly in impedance with changes in the condition being sensed, for example, in the field of humidity sensing the impedance of the sensing element may vary from a value in the order of 4 megohms down to about 4,000 ohms as the humidity changes from about 10% R.H. to 90% R.H. When the condition sensing bridge circuit is connected to the input of a current amplifier such as a transistor amplifier which operates on a relatively constant current level, it is desirable that the current output of the bridge circuit be approximately equal for the same percentage of departure from the desired set point at any setting of the apparatus. In the present invention this desired feature is provided by arranging the bridge circuit such that as the set point is adjusted, the energizing potential applied across the bridge is simultaneously varied to compensate for the change in resistance introduced into the bridge by set point adjustment.

It is an object of the present invention therefore to provide in a transistor control circuit an improved condition sensing impedance bridge circuit which is arranged to provide the same current output for a given percentage of departure from the desired set point at any control range of the apparatus.

This and other objects of the invention will become more apparent upon consideration of the specification, claims, and drawings of which:

FIGURE 3 is a simplified showing of the invention of FIGURE 1.

Figure 1:
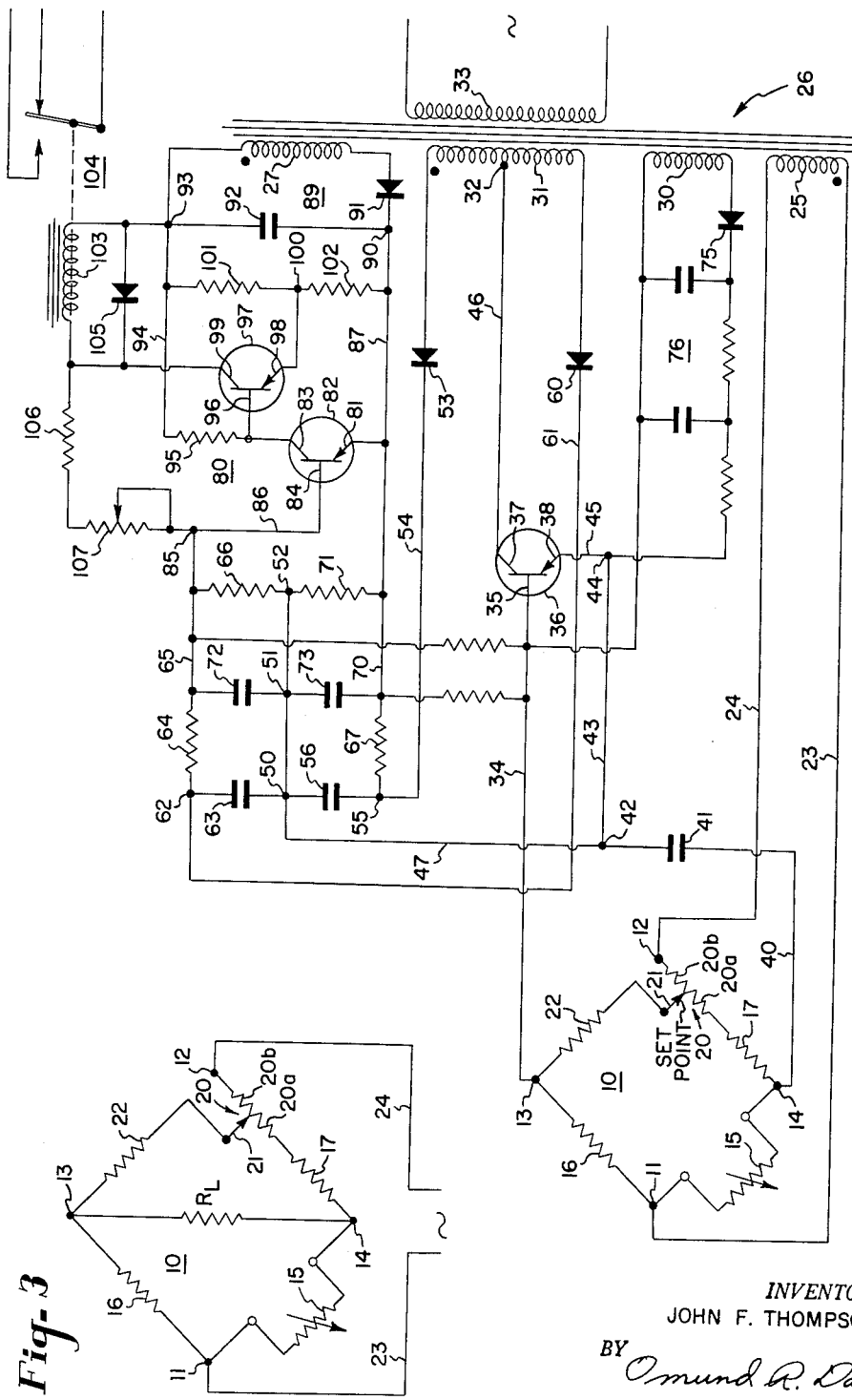
FIGURE 1 is a schematic diagram of an embodiment of the invention.

Referring now to FIGURE 1, there is disclosed a condition responsive impedance bridge type network 10 which has a pair of power input terminals 11 and 12, and a pair of signal output terminals 13 and 14. The bridge circuit components comprise a condition responsive impedance element 15 connected between the terminals 11 and 14, the element here being disclosed as a humidity responsive element, for example of the ceramic type in which the resistance varies by several orders of magnitude over the sensing range, that is the resistance may vary from a value in the order of several megohms down to a value of several thousand ohms from conditions of low relative humidity to high relative humidity. The bridge circuit also comprises a resistance element 16 connected between the terminals 11 and 13; a resistor 17 and a resistance element 20 having portions 20a and 20b connected in series between the terminal 14 and the terminal 12, respectively, the resistance element 20 here being shown as a potentiometer voltage divider having an adjustable intermediate tap of wiper 21 associated therewith; and a resistor 22 connected between the terminal 13 and the adjustable tap 21 of the potentiometer 20. The position of wiper 21 of set point control potentiometer 20 determines the relative magnitude of the portions 20a and 20b.

The bridge circuit 10 is energized from a source of A.C. potential, the power input terminals 11 and 12 being connected by conductors 23 and 24 to a secondary winding 25 of a power transformer 26. The power transformer 26 also includes a secondary winding 27, a secondary winding 30, a secondary winding 31 having a center tap 32, and a primary winding 33 which is energized from a suitable source of alternating current potential, not shown.

The signal output terminal 13 of bridge 10 is connected by a conductor 34 to a control electrode 35 of a transistor 36. The transistor 36 also includes a collector electrode 37 and an emitter electrode 38. The other signal output electrode 14 of bridge 10 is connected by means of a conductor 40, a coupling capacitor 41, a junction 42, a conductor 43, a junction 44 and a conductor 45 to the emitter electrode 38 of the transistor 36.

The collector electrode 37 is connected by a conductor 46 to the center tap 32 of the secondary winding 31. The emitter electrode 38 is connected by conductors 45, 43, the junction 42 and a conductor 47 to junctions 50, 51, and 52. The upper extremity of winding 31 is connected through a rectifier 53, such as a junction diode, a conductor 54, a junction 55, and a capacitor 56 to the junction 50. Likewise the lower extremity of the winding 31 is connected through the rectifier 60, a conductor 61, a junction 62 and a capacitor 63 to the junction 50. The junction 62 is also connected through a resistor 64, a conductor 65 and a resistor 66 to the junction 52. Likewise the junction 55 is connected through a resistor 67, a conductor 70 and a resistor 71 to the junction 52. A pair of capacitors 72 and 73 are connected in parallel with the resistors 66 and 71, respectively.

The transistor 36 and the associated components, above discussed, operate as a phase sensitive discriminator-demodulator circuit to provide a direct current potential output across the conductors 65 and 70 of a polarity dependent upon the phase of the control or error signal from the bridge 10. This discriminator-demodulator circuit is described in greater detail in the copending application Serial No. 678,138, filed August 14, 1957, entitled Semiconductor Apparatus, now matured into United States Patent No. 2,911,545, and assigned to the same assignee as the present invention.

The A.C. potential of the secondary winding 30 of the transformer 26 is rectified by a half-wave rectifier 75, smoothed by a conventional resistance-capacity filter 76 and applied as a D.C. bias current between the emitter and control electrode of the transistor 36 to establish a quiescent operating condition for the transistor.

The output circuit of the discriminator circuit is connected to the control electrodes of a transistor switching circuit 80; the conductor 70 is directly connected to an emitter 81 of a transistor 82, which transistor also includes a collector electrode 83 and a control electrode 84. The conductor 65 is connected through a junction 85 and a conductor 86 to said control electrode 84. The emitter electrode 81 is also connected by a conductor 87 to the positive terminal 90 of a source of potential 89 which comprises the transformer secondary winding 27, a rectifier 91 and a filter capacitor 92. The negative terminal 93 of the D.C. supply is connected through a conductor 94 and a collector load resistor 95 to the collector electrode 83 of transistor 82. The collector electrode 83 is also directly connected to a control electrode 96 of a transistor 97. The transistor 97 also includes an emitter electrode 98 and a collector electrode 99. The emitter electrode 98 is connected to an intermediate tap 100 of a voltage divider network connected in parallel with the filter capacitor 92, which network comprises resistors 101 and 102. The collector electrode 99 is connected through the winding 103 of a load relay 104 to the negative supply terminal 93. A junction diode 105 is connected in parallel with the relay winding 103 to preclude inductive voltage transients from damaging the transistor. A regenerative feedback circuit is also connected between the collector 99 and the control electrode 84 and includes a resistor 106 and a differential control potentiometer 107.

Figure 2:
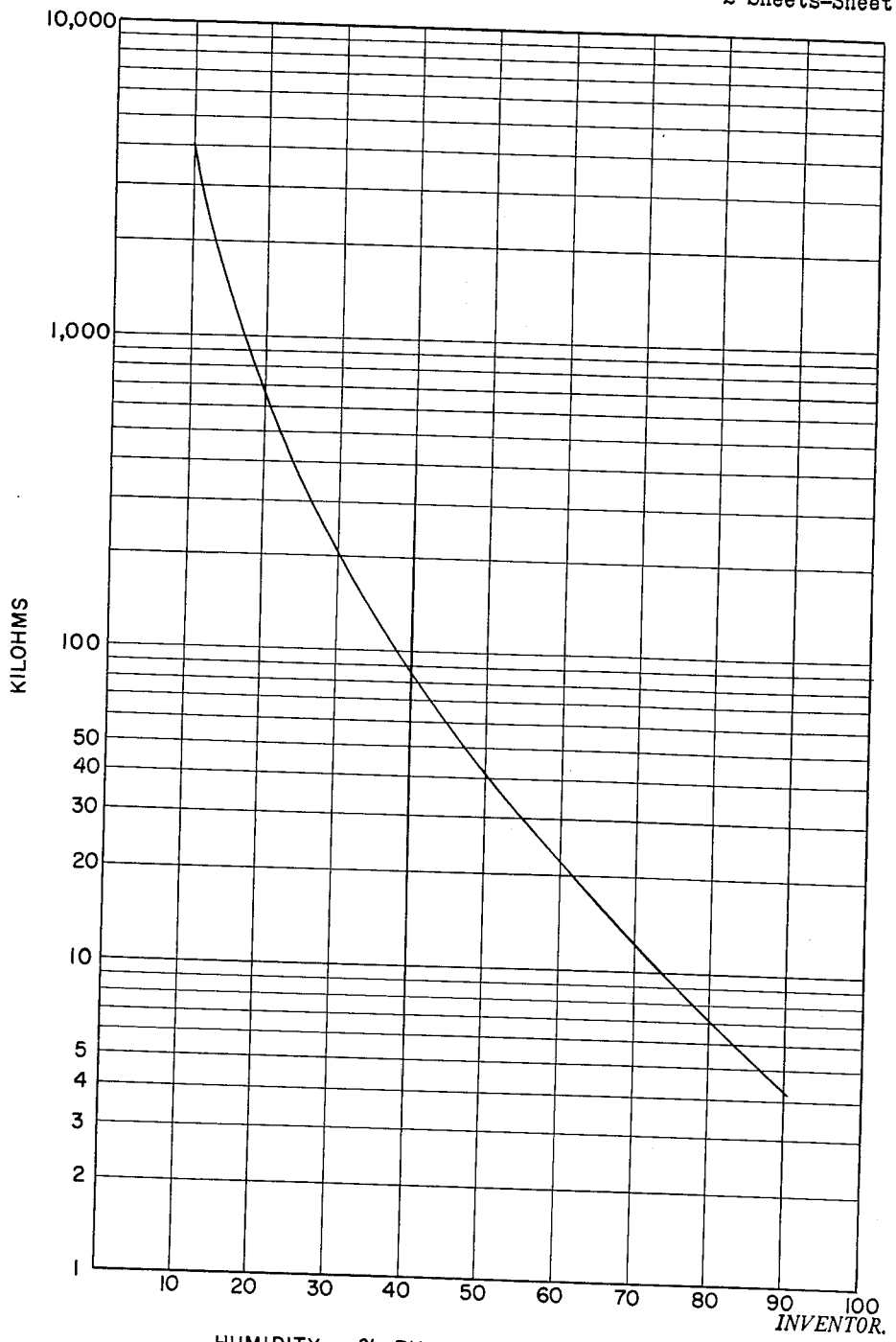
FIGURE 2 is a graph showing the range over which a typical humidity sensing element operates.

Referring now briefly to FIGURE 3, which discloses a bridge circuit of the same type shown in FIGURE 1, it will be seen that the resistance $R_L$ represents the input resistance of the transistor discriminator relay circuit of FIGURE 1. The transistor discriminator and relay circuit of FIGURE 1 operates on a fixed current level from the bridge 10. In other words, at any setting of the set point potentiometer 20, the same signal current from the bridge is required to operate the relay circuit. The desired operation is that the percentage change in the sensed condition from the desired condition required to provide the fixed current to operate the relay be the same at any setting of the control point potentiometer 20. From a brief consideration of FIGURE 2, which shows a response curve of a typical ceramic humidity sensing element plotting the percentage relative humidity against resistance of the sensing element, it can be seen that the resistance varies from in excess of 3 megohms down to less than 5,000 ohms, over the sensing range. Considering again FIGURE 3, it can be seen that if the bridge supply voltage is held constant, a greater percent change in the sensing element is required when the sensing element is in the 3 to 4 megohm range than when the sensing element is in the 5 to 10,000 ohm range to obtain the same output current signal from the bridge. This is due to the tremendous difference in resistance values of the bridge elements at the two extremes of control setting.

In this invention there is provided an improved arrangement to compensate for the very large change in the resistance of the sensing element. This is accomplished by arranging the set point potentiometer 20 such that as the resistance of the set point leg portion 20a of the bridge between terminal 14 and wiper 21 is reduced, the remaining resistance 20b of the potentiometer is added in series with the alternating current source, to thereby reduce the voltage supply to the bridge terminals. Conversely, when the set point adjustment wiper 21 is moved towards the terminal 12, thereby increasing the resistance in the set point control leg portion 20a between terminal 14 and the wiper 21, the portion 20b in series with the A.C. source is simultaneously reduced so that the voltage applied across the bridge terminals is increased.

In one successful embodiment of the invention the secondary winding 25 of the power transformer provides approximately 100 volts A.C. to the terminals 11 and 12. The sensing element operates in the range shown in FIGURE 2. The potentiometer 20 may be, by way of example, a .3 megohm logarithmic taper type with resistor 22 being about 10,000 ohms and resistor 16 being 100,000 ohms. This entire potential may energize the bridge when the wiper 21 is moved to the extremity of the potentiometer winding adjacent terminal 12. When the set point wiper is moved in the opposite direction, away from terminal 12, to control at a point of high relative humidity, only a small fraction of the 100 volts appears across the bridge terminals, that is, from terminal 11 to the point at which wiper 21 contacts the element 20. The remainder of the potential appears across the portion 20b of the potentiometer winding between the wiper 21 and terminal 12. This portion 20b of the potentiometer is external to the bridge circuit. By a proper selection of the magnitude of the energizing source and by proper design of the magnitude of the bridge circuit components, a circuit is provided in which a given percentage change in relative humidity produces the same current output from the bridge whether the sensing element is working in the megohm range or in the kilohm range.

Considering further the operation of FIGURE 1, as has been previously mentioned, the transistor discriminator circuit and the transistor switching circuit operate on a predetermined magnitude of current from the signal bridge. When the bridge circuit is balanced so that no alternating output signal is produced from the bridge, the transistor 36 is caused to conduct a substantially constant amount throughout the cycle by the D.C. bias current flowing in the emitter-base circuit from the output of the filter network 76. This results in substantially equal and opposite voltages across the capacitors 63 and 56 and also results in equal and opposite voltages across the resistors 66 and 71 so that a substantially zero D.C. potential exists between the conductor 65 and the conductor 70.

Under these conditions, the transistor switching circuit 80 remains in an operating condition such that transistor 82 is conductive and transistor 97 is cut off whereby the relay 104 remains unenergized.

With a change in the condition being sensed, the resistance value of the sensing element 15 changes to unbalance the bridge and provide an alternating current signal to the input electrodes of the transistor 36. As a result the current flowing through the transistor 36 is increased during one half cycle and decreased during the succeeding half cycle of A.C. potential on winding 31. Let it be assumed that the phase of the signal is such that the transistor 36 is rendered more conductive when the lower extremity of transformer winding 31 is instantaneously positive. As a result the voltage across capacitor 63 increases and the voltage on capacitor 56 decreases by approximately the same amount resulting in a D.C. potential on output conductors 65 and 70 which is of a polarity to tend to turn off transistor 82. The transistor switching circuit 80 then switches to a condition with transistor 97 conductive, thereby energizing the relay which may control apparatus to bring the sensed condition back to the desired value.

In general, while I have shown certain specific embodiments of my invention, it is to be understood that this is for the purpose of illustration and that my invention is to be limited solely by the scope of the appended claims.

I claim:

1. Condition control apparatus comprising in combination: a source of electrical current; relay load means; transistor current control means connected to said relay means and said source and energizable by a predetermined level of signal current to operate said relay means; condition responsive resistive means, the magnitude of the resistance of said resistive means being a function of the condition being sensed; set point control potentiometer means having a resistive element and first and second end terminals thereon, said potentiometer means also including an adjustable intermediate contact on said resistive element; electrical resistive bridge means comprising a plurality of resistive legs including said condition responsive resistive means in one leg, and the portion of said potentiometer resistive element between said first end terminal and said adjustable contact in another leg; power input terminals on said bridge means energized from an alternating current source, one of said power input terminals including the second end terminal of said potentiometer means and the portion of said resistive element between said second end terminal and said adjustable contact, output terminals on said bridge means connected in controlling relation to said transistor current control means, said bridge means providing a predetermined output current for a given deviation from the desired control point at any setting of said control potentiometer means.

2. Condition control apparatus comprising in combination: a source of electrical current; controlled means requiring a predetermined level of signal current to operate said controlled means; condition responsive impedance means, the magnitude of the impedance of said condition responsive means being a function of the condition being sensed; set point control potentiometer type means having an impedance element and first and second terminals thereon, said potentiometer type means also including an adjustable contact on said impedance element; electrical bridge means comprising a plurality of impedance legs including said condition responsive impedance means in one leg, and the portion of said potentiometer element between said first terminal and said adjustable contact in another of said legs; power input terminals on said bridge means energized from an electrical source, one of said power input terminals including the second terminal of said potentiometer type means and the portion of said impedance element between said second terminal and said adjustable contact, output terminals on said bridge means connected in controlling relation to said controlled means, said bridge means providing a predetermined output current for a given deviation from the desired control point at any setting of said control point potentiometer type means.

3. Humidity control apparatus comprising in combination: a source of electrical current; relay load means for controlling humidity varying apparatus; transistor current control means connected to said relay means and said source and energizable by a predetermined level of signal current to operate said relay means; relative humidity responsive resistive means, the magnitude of the resistance of said resistive means being a function of the relative humidity being sensed; set point control potentiometer means having a resistive element and first and second end terminals thereon, said potentiometer means also including an adjustable contact on said resistive element; electrical resistive bridge means comprising a plurality of resistive legs including said humidity responsive resistive means in one leg, and the portion of said potentiometer element between said first end terminal and said adjustable contact in another leg; power input terminals on said bridge means energized from an alternating current source, one of said power input terminals including the second end terminal of said potentiometer means and the portion of said resistive element between said second end terminal and said adjustable contact, output terminals on said bridge means connected in controlling relation to said transistor current control means, said bridge means providing a predetermined output current for a given deviation from the desired control point at any setting of said control potentiometer means.

4. Condition sensing bridge means comprising an impedance bridge having a pair of power input terminals, a pair of signal output terminals and four resistive legs, the first of said resistive legs being connected between the first of said power input terminals and the first of said output terminals, the second of said legs comprising a condition responsive resistive element having a large variation in resistance over the sensing range, said second leg being connected between said first input terminal and the second of said output terminals, the third resistive leg being adjustable and comprising a portion of a set point potentiometer resistive element said potentiometer comprising a resistive element having first and second end terminals and an intermediate adjustable tap connection in movable contact thereon, said first resistive element end terminal being connected to said second output terminal, the fourth of said resistive legs being connected between said first output terminal and said adjustable tap connection, the junction point of said tap connection with said resistive element forming the second of said pair of power input terminals, and connection means connecting said second end terminal to a source of electrical power.

5. Humidity sensing bridge means comprising an impedance bridge having a pair of power input terminals, a pair of signal output terminals and four resistive legs, the first of said resistive legs being connected between the first of said power input terminals and the first of said output terminals, the second of said legs comprising a relative humidity responsive resistive element having a large variation in resistance from a low value at high relative humidity to a high value at conditions of low relative humidity, said second leg being connected between said first input terminal and the second of said output terminals, a set point potentiometer comprising a resistive element having first and second end terminals and an intermediate adjustable tap connection movably connected thereon the third resistive leg comprising a variable portion of said set point potentiometer resistive element between said first end terminal and said intermediate adjustable tap connection in contact therewith, said first end terminal being connected to said second output terminal, the fourth of said resistive legs being connected between said first output terminal and said adjustable tap connection, the junction point of said tap connection with said resistive element forming the second of said pair of power input terminals, and connection means including the remaining portion of said resistive element between said tap connection and said second end terminal connecting said second power input terminal to a source of electrical power such that the magnitude of said electrical power applied to said second power input terminal is a function of the setting of said adjustable tap connection which adjusts the humidity control point.

6. Humidity sensing bridge means comprising an impedance bridge having first and second power input terminals, a pair of signal output terminals and four resistive legs, the first of said resistive legs being connected between the first of said power input terminals and the first of said output terminals, the second of said legs comprising a relative humidity responsive resistive element which may vary in resistance by a factor in the order of 1000 times from a low value at high relative humidity to a high value at conditions of low relative humidity, said second leg being connected between said first input terminal and the second of said output terminals, a set point potentiometer comprising a resistive element having first and second end terminals and adjustable intermediate tap connection movably connected thereon, the third resistive leg comprising a portion of said set point potentiometer resistive element between said first end terminal and said intermediate adjustable tap connection, said first end terminal being connected to said second output terminal, the fourth of said resistive legs being connected between said first output terminal and said adjustable tap connection, the junction point of said tap connection with said resistive element forming said second power input terminal, and connection means including the remaining portion of said resistive element and said second end terminal connecting said second power input terminal to a source of electrical power.

7. In an electrical bridge network for controlling a current operated load in response to a condition in which the impedance of the sensing element varies by an extremely large amount over the sensing range, making it desirable that the bridge energizing voltage be varied as a function of set point, the combination comprising: an impedance bridge circuit having at least four legs, a first and second of said legs comprising respective resistive elements, a third of said legs comprising condition responsive resistive means which varies in impedance by a large extent from one limit to the other of the condition being sensed, the fourth of said legs being adjustable resistive means for for providing set point control comprising potentiometer means having a resistive element and an adjustable intermediate tap movably associated thereon, means terminating said second leg in said intermediate tap, the junction point of said tap with said resistive element also terminating said fourth adjustable leg; and means connecting the remaining portion of said potentiometer resistive element which is external to said bridge circuit to a source of electrical energy for energizing said bridge circuit, so that as said tap is adjusted along said element the magnitude of said fourth leg is varied and simultaneously the magnitude of said remaining portion is varied inversely whereby the potential applied to said bridge network is increased as the set point resistance is increased.

8. In an electrical bridge network for controlling a current operated load in response to relative humidity in which the impedance of the sensing element varies by an extremely large amount over the sensing range, making it desirable that the bridge energizing voltage be varied as a function of set point, the combination comprising; an impedance bridge circuit having at least four legs, a first and second of said legs comprising respective resistive elements, a third of said legs comprising humidity responsive resistive means, which resistive means varies in impedance by a large extent from condition of high relative humidity to low relative humidity, the fourth of said legs being adjustable resistive means for providing a desired percent relative humidity set point control comprising potentiometer means having a resistive element and an adjustable intermediate tap movably associated thereon, means terminating said second resistive leg in said intermediate tap, the junction point of said tap with said resistive element terminating said fourth adjustable leg and forming a power input terminal of said bridge circuit; and means connecting the remaining portion of said potentiometer resistive element which is external to said bridge circuit to a source of electrical energy for energizing said bridge circuit, so that as said tap is adjusted along said element the magnitude of said fourth leg is varied and simultaneously the magnitude of said remaining portion is varied inversely whereby the potential applied to said bridge network is increased as the fourth leg set point resistance is increased.

9. In a condition responsive signal producing electrical bridge network for controlling current operated load apparatus in response to a condition, the load apparatus being operated on a predetermined level of current; in which the impedance of the condition sensing element varies by several orders of magnitude over the sensing range, making it desirable that the bridge energizing voltage be varied as a function of condition set point, the combination comprising: an impedance bridge circuit having at least four legs, a first and second of said legs comprising respective resistive elements, a third of said legs comprising condition responsive resistive means which may vary in impedance by up to several orders of magnitude from one limit to the other of the condition being sensed, the fourth of said legs being adjustable resistive means for providing a desired control set point comprising potentiometer means having a resistive element and an adjustable intermediate tap movably associated thereon, means connecting said second leg to terminate at said intermediate tap, the junction point of said tap with said resistive element also effectively terminating said fourth adjustable leg; and means connecting the remaining portion of said potentiometer resistive element which is external to said bridge circuit to a source of electrical energy for energizing said bridge circuit, so that as said tap is adjusted along said element the magnitude of said fourth leg is varied and simultaneously the magnitude of said remaining portion is varied inversely whereby the potential applied to said bridge network is increased as the set point resistance is increased.

10. Condition responsive impedance means for producing a signal current in response to a condition being sensed, comprising: a bridge type network having a pair of signal output terminals at diametrically opposed junctions of said network, said bridge type network having a plurality of impedance legs, one of said legs comprising a condition sensing impedance element which varies in impedance in a substantially logarithmic manner over the range of the condition being sensed; set point potentiometer means having a resistance element with first and second terminals and an adjustable intermediate tap in adjustable contact with said element, said intermediate tap, in effect, dividing said resistance element between said first and second terminals into a first and a second portion respectively with the magnitudes of the portions being controlled by the setting of said tap, said first portion forming at least a part of a second of said impedance legs; means connecting said intermediate tap to a third of said legs; means connecting said second terminal and thus said second portion to a source of electrical energy for energizing said bridge network, the junction of said adjustable tap with said element forming a power input terminal for said bridge network, the adjustment of said tap varying the impedance of said first portion to control the set point of said bridge network and simultaneously varying the second portion of said element which is external to said bridge network, so that as the set point is adjusted thereby resulting in a substantial change in the impedance of the bridge network, the magnitude of the electrical power applied at said power input terminal is simultaneously varied to provide a substantially constant output current from said bridge network for a given percentage change in the impedance of the sensing leg at any point in the sensing range.

11. Humidity responsive impedance means for producing a signal current in response to relative humidity being sensed, comprising: a bridge type network having a pair of signal output terminals at a first pair of diametrically opposed junctions of said network, said bridge type network having a plurality of impedance legs, one of said legs comprising humidity responsive impedance means which varies in impedance in a substantially logarithmic manner over range of relative humidity being sensed; set point potentiometer means having a resistance element with first and second terminals and an adjustable intermediate tap in adjustable contact with said element, said intermediate tap, in effect, dividing said resistance element between said first and second terminals into a first and a second portion respectively with the magnitudes of the portions being controlled by the setting of said tap, said first portion forming a controllable section of a second of said impedance legs; means connecting said intermediate tap to a third of said legs; means connecting said second terminal and thus said second resistive element portion to a source of electrical power for thereby energizing said bridge network, the junction point of said adjustable tap with said element forming a power input terminal for said bridge network, the adjustment of said tap moving the location of said power input terminal and varying the impedance of said first portion to control the set point of said bridge network and simultaneously varying the second portion of said element which is external to said bridge network, so that as the set point is adjusted thereby resulting in a substantial change in the impedance of the bridge network, the magnitude of the electrical power applied at said power input terminal is simultaneously varied to provide a substantially constant output current from said bridge network for a given percentage change in the impedance of the humidity sensing leg at any point in the sensing range.

References Cited in the file of this patent

UNITED STATES PATENTS 2,707,880    Wannamaker    May 10, 1955
2,885,630    Webb    May 5, 1959